United States Patent [19]

Bruckert

[11] Patent Number: 5,038,399

[45] Date of Patent: Aug. 6, 1991

[54] METHOD FOR ASSIGNING CHANNEL REUSE LEVELS IN A MULTI-LEVEL CELLULAR SYSTEM

[75] Inventor: Eugene J. Bruckert, Arlington Heights, Ill.

[73] Assignee: Motorola, Inc., Schaumburg, Ill.

[21] Appl. No.: 526,407

[22] Filed: May 21, 1990

[51] Int. Cl.$^5$ .................... H04B 1/00; H04B 7/00; H04Q 7/00

[52] U.S. Cl. .................... 455/33; 455/34; 455/54; 455/62; 455/67; 379/59

[58] Field of Search .................... 455/33, 34, 54, 56, 455/62, 67, 53; 379/59, 60, 63

[56] References Cited

U.S. PATENT DOCUMENTS

| | | |
|---|---|---|
| 4,144,411 | 3/1979 | Frenkiel . |
| 4,144,496 | 3/1979 | Cunningham . |
| 4,481,670 | 11/1984 | Freeburg . |
| 4,670,906 | 6/1987 | Thro . |
| 4,718,081 | 1/1988 | Brenig . |
| 4,736,453 | 4/1988 | Schloemer . |

OTHER PUBLICATIONS

Halpern, Samuel W., "Reuse Partitioning in Cellular Systems", 33rd IEEE Vehicular Technology Conference, May 25-27, 1983, pp. 322-327.

Primary Examiner—Reinhard J. Eisenzopf
Assistant Examiner—Chi H. Pham
Attorney, Agent, or Firm—Shawn B. Dempster; F. John Motsinger

[57] ABSTRACT

In a radio frequency communication system employing channelization, such as a cellular TDMA system, and having a plurality of reuse channel levels, such as multiple frequency reuse patterns, each level having at least one associated reuse channel, a method and device comprising: determining relative interference for a reuse channel of a first reuse level in relation to relative interference for a reuse channel of at least a second reuse level resulting in a reuse level gradient and assigning the subscriber unit to at least one reuse level in response to the reuse level gradient.

12 Claims, 3 Drawing Sheets

0 SITE = SERVING CELL
1 SITE REUSE LEVEL = CELLS 1A-1F
3 SITE REUSE LEVEL = CELLS 3A-3F
4 SITE REUSE LEVEL = CELLS 4A-4F

METHOD FOR ASSIGNING CHANNEL REUSE LEVELS IN A MULTI-LEVEL CELLULAR SYSTEM

FIELD OF INVENTION

The invention relates generally to radio frequency (RF) communication systems and more particularly to cellular type radio communication systems employing multiple channel reuse levels.

BACKGROUND OF THE INVENTION

U.S. Pat. No. 4,144,411 issued to Frenkiel on Mar. 13, 1979, teaches static reuse of frequencies in a large-cell reuse pattern to a miniature-sized overlaid, but same type reuse pattern. Therefore, the miniature-sized reuse pattern and the large-cell patterns are both on seven-cell repeat patterns. This is achieved through yet lower transmit powers and maintaining the same site spacing to cell radius as the large-cell. This concept is referred to as cell splitting and is one method of improving frequency reuse of traffic channels in a geographic region. The decision to handoff from an overlaid serving cell to an underlaid cell (not from one reuse pattern to another at the same site) is based on whether a subscriber's received signal strength (RSS) is greater than a threshold set for the overlaid cell. If the RSS is equal to or less than the predetermined threshold, a check is made to see if there is a large-cell channel available.

An enhancement to Frenkiel is discussed in an article authored by Samuel W. Halpern entitled *Reuse Partitioning in Cellular Systems*, presented at the 33rd IEEE Vehicular Technology Conference on May 25-27, 1983 in Toronto, Ontario, Canada. The Halpern article sets forth a cellular system having multiple resuse levels (or patterns) within a given geographical area. A reuse level will refer to a particular channel reuse pattern whether the channel is based on frequency, time slots, codes, or other suitable divisions. For example, a cluster of cells normally employing a seven-cell reuse pattern may simultaneously operate on a three-cell reuse pattern whereby one set of frequencies is dedicated to the three-cell reuse pattern while another set of frequencies is dedicated to the nine-cell reuse pattern. This division of frequency spectrum into two groups of mutually exclusive channels is one method of providing multiple reuse levels. Consequently, one cell site may operate on both a nine-cell and a three-cell reuse pattern by using channels from its channel set which are dedicated to specific cell sites and assigned to the different reuse patterns. Such smaller reuse patterns form a noncontiguous overlay of cells having a decreased radius. Although this article discusses channels in terms of frequencies, it is well understood that channels include data channels and traffic channels, which may be time slots within the same frequency such as in a Time Division Multiple Access (TDMA) system, or traffic channels and data channels in other types of channelized systems such as Code Division Multiple Access (CDMA) systems.

Generally, the principle behind the Halpern system is to allow a degradation of C/I performance for those subscriber units that already have more than adequate C/I protection while providing greater C/I protection to those subscribers that require it. Therefore, a subscriber with the best received signal quality will be assigned to the set of channels for the three-cell reuse pattern since they are able to tolerate more co-channel interference than a subscriber whose signal quality is poorer. The subscriber having the poorer received signal quality is therefore assigned to a channel correspondent to the nine-cell reuse pattern. Halpern disclosed a ratio metric determination of how to assign subscriber units to achieve approximately a 30% increase in capacity over a seven-cell reuse level system. This resulted by maintaining 60% of the subscribers in the three-cell level while maintaining 40% in the nine-cell level. However, this reuse partitioning system as disclosed generally indicates that the received signal quality measurement is taken only by the serving cell. The serving cell then determines which reuse channel to assign the subscriber based upon the 60/40 predetermined ratio. Such a method fails to adequately account for interference from surrounding site interference whether the sites are neighboring sites, adjacent sites, or even distant sites causing interference through multipath interference or by some other impairing phenomenon. Such a system typically allocates a subscriber on its C/I relation to all other subscribers in that the 60% of the subscribers having the best C/I are assigned to the three-cell reuse pattern even though they may perform better on a different reuse level.

Other frequency reuse systems take into account all base sites within a given geographic coverage area, and then determine those sites that are allowed to transmit at the reuse frequency based upon the combined signal strength of all the measured sites. Such a system is disclosed in U.S. Pat. No. 4,670,906 by Thro, issued on June 2, 1987, and assigned to instant assignee. In large cellular systems having many base sites within a small area, such systems become computationally intensive resulting in increased processing demands and increased system complexity, particularly as more base sites are added.

In addition, systems employing dynamic multiple levels, such as that described by Schaeffer in instant assignee's U.S. application Ser. No. 07/485,718 filed Feb. 27, 1990, cause further interference complications since neighboring sites and further distant sites may cause rapidly changing interference through the continuously changing reuse patterns. A static system (as generally disclosed by Halpern) typically dedicates a set of channels to the cells of a specific reuse pattern and are not generally reassigned to a different reuse pattern in neighboring cells. Systems employing multiple dynamic channel reuse levels generally allow reuse channels to be dynamically assigned multiple times during the same conversation to neighboring cells or different reuse levels in accordance with system reuse guidelines. Therefore, the appropriate reuse level to assign the serving station or to assign the subscriber unit must be rapidly evaluated and adequately determined while still accommodating increases in system capacity.

There exists a need for a reliable and relatively rapid method for assigning channel reuse levels to subscriber units in either a static multi-level reuse system or a dynamic multi-level reuse system. Such a method should include sufficient interference measurement both uplink and downlink to provide a more reliable C/I determination by which reuse levels are assigned to appropriate serving sites and subscribers are assigned to appropriate reuse levels.

SUMMARY OF THE INVENTION

These needs and others have been substantially met through the method of assigning reuse levels in a multi-level cellular system disclosed below. In a radio frequency communication system employing channelization, such as a cellular TDMA system, and having a plurality of reuse channel levels, such as multiple frequency reuse patterns, each level having at least one associated reuse channel, the method comprising: determining relative interference for a reuse channel of a first reuse level in relation to relative interference for a reuse channel of at least a second reuse level resulting in a reuse level gradient and assigning the subscriber unit to at least one reuse level in response to the reuse level gradient.

One embodiment of the invention includes a process for determining the relative interference for separate reuse levels which includes summing measured signal strengths from multiple reuse channels corresponding to one of the pluralities of reuse levels, such as those signals used by those base stations corresponding to the same reuse level, resulting in at least a first signal strength combination and then determining a ratio of the signal strength of the subscriber unit, as measured at the serving station, to the at least first signal strength combination. This process is then repeated using measured signal strengths from those base sites corresponding to another reuse level, such as the next largest or smallest reuse pattern, after which the reuse level gradient between the multiple levels is used to determine the appropriate reuse level for the serving station to assign to the subscriber unit.

PREFERRED EMBODIMENT

Figure 1:
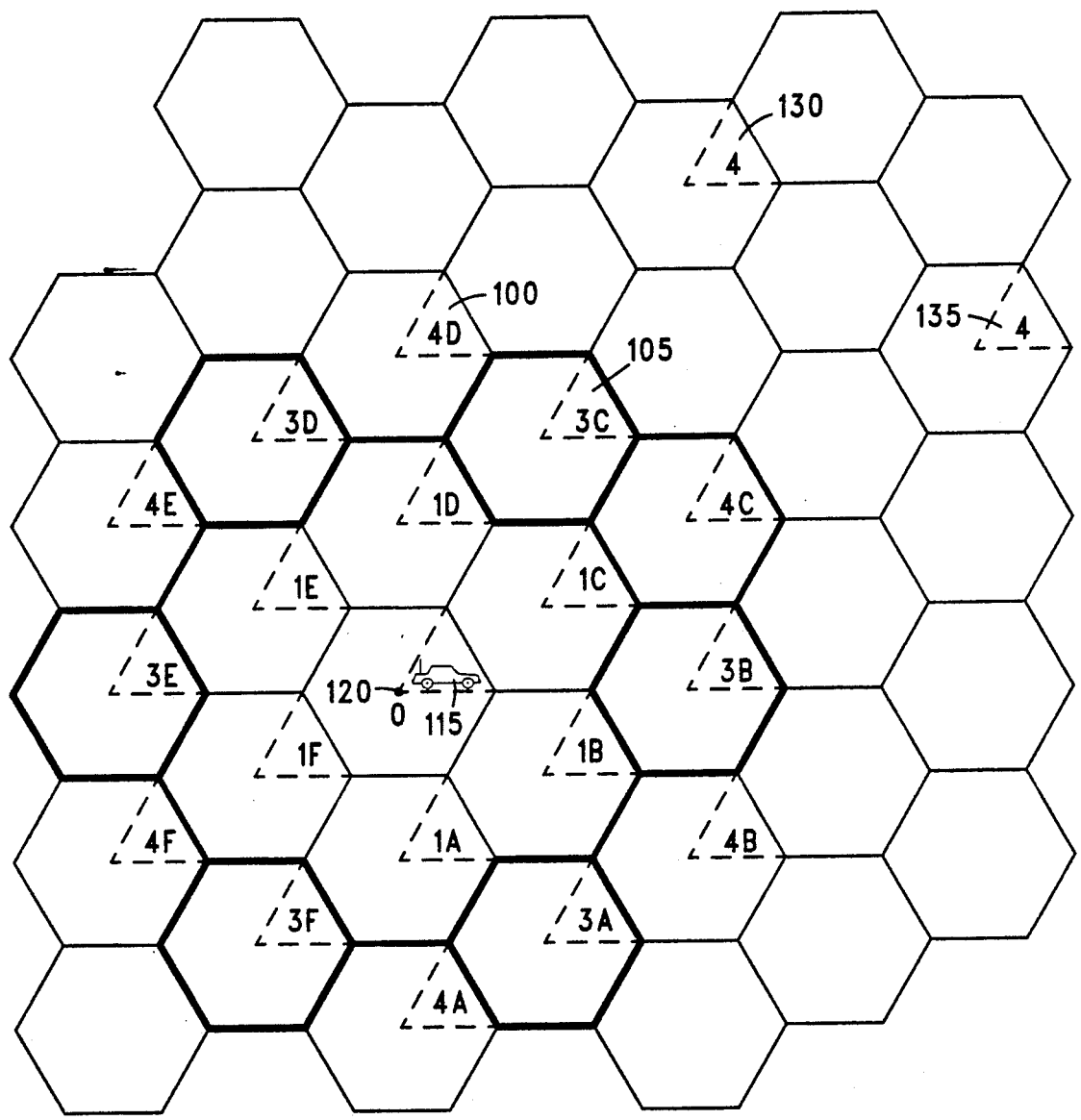
FIG. 1 illustrates a cellular coverage area using simultaneous multi-level reuse including one-site reuse patterns, three-site reuse patterns, and four-site reuse patterns.

FIG. 1 illustrates a typical cellular system employing multiple levels of reuse channels and includes at least one subscriber unit (115) communicating to a serving base site (120) at a serving cell and whose sites are capable of dynamically providing reuse levels such as a nominal four-site reuse level (100) depicted by sectors 4a-4f (i.e. a frequency reuse pattern), a three-site reuse level (105) depicted by 3a-3f, and a one-site reuse level (110) depicted by a 1a-1f. For purposes of discussion, it will be assumed that one base site serves one cell which commonly has up to six 60 degree sectors. The nominal four-site repeat pattern (100) may be one as described in U.S. Pat. No. 4,128,740 issued Dec. 5, 1978, to Graziano and assigned to instant assignee, disclosing center illuminated sectorized cells based on 60-degree directional antennas. Any nominal reuse pattern greater than four-site reuse (for example seven-site, nine-site, or twelve-site) is equally suitable to the method of invention described herein. The reuse levels are taken with respect to the serving site (120). As understood by those skilled in the art, sectors 130 and 135 are also on a four-site reuse pattern with respect to the serving site (120). Each sector transmits a control channel using its directional antenna. Those skilled in the art will recognize that the sites (or sectors) need not be geographically determined but may be radiographically determined via signal propagation characteristics.

The cellular system is dynamic in nature since the system may control base site channel assignments for the various sites to vary the reuse pattern of any sector numerous times during one conversation. For example, when it is determined that the subscriber unit is to be on a four-site reuse pattern, that serving site frequency for that subscriber may only be reused in sectors 4a-4f or any other sector which is on a four-site pattern with the serving site (120). In addition, the subscriber may be switched to a three-site channel, but only sectors on a three-site reuse pattern (sectors 3a-3f) may transmit the three-site channel. Such a system may also be of a frequency-hopping type described by Schaeffer in instant assignee's U.S. application Ser. No. 07/485,718 filed Feb. 27, 1990.

The invention may be applied during call setup to determine the initial reuse level to assign the subscriber unit, but the invention will be discussed as it applies to call maintenance situations wherein a serving station (120) may reassign the subscriber unit (115) to different reuse levels assigned to the same serving station (120) during one conversation to further maximize system capacity. In addition, the invention may also serve to determine when the system should dynamically assign the serving station (120) different reuse levels.

Figure 2:
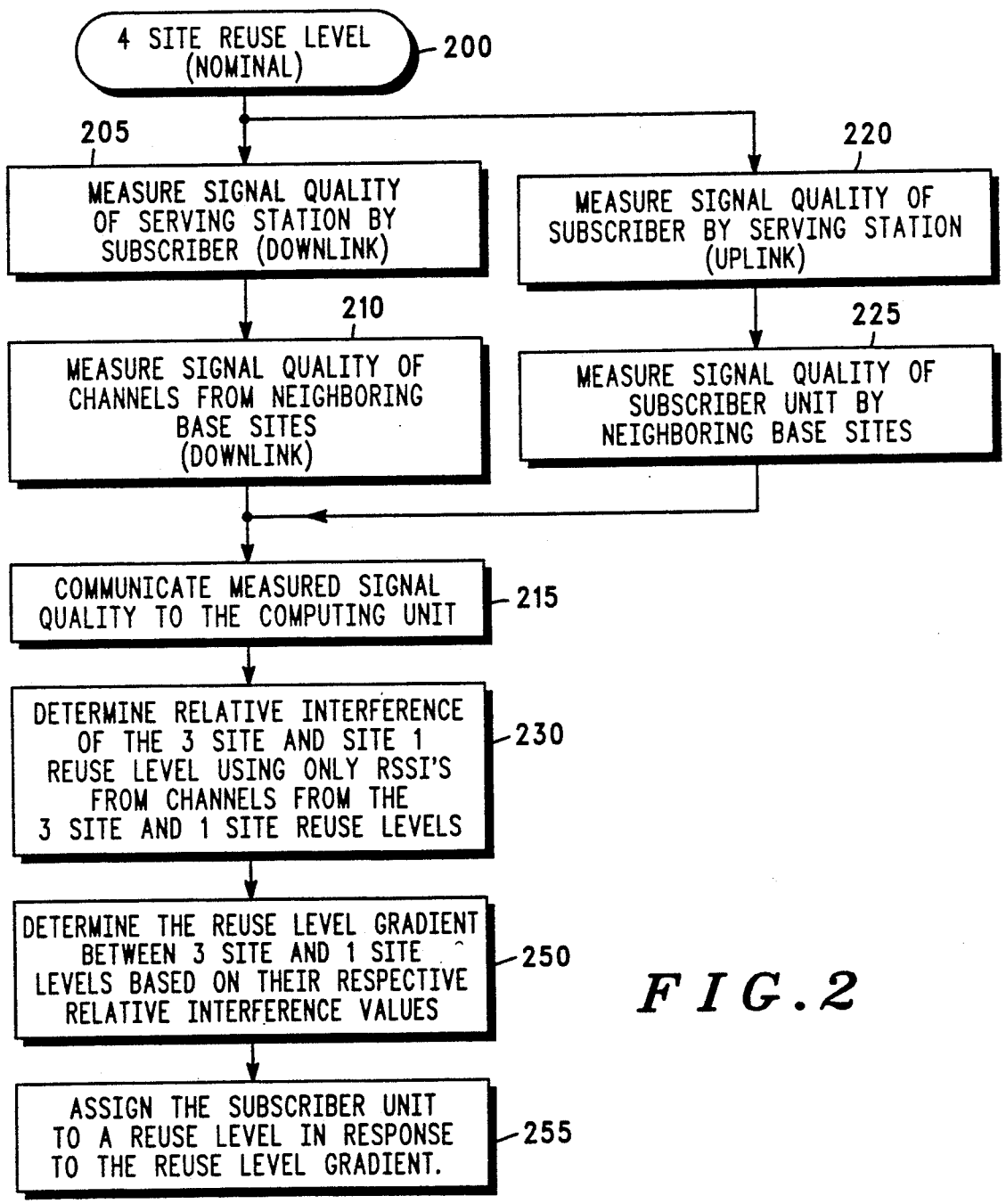
FIG. 2 is a flow chart depicting the preferred embodiment for determining the appropriate reuse levels in the system of FIG. 1 in accordance with the invention.

FIG. 2 illustrates the best method of operation assuming the subscriber unit is already operating on a first reuse level (200), such as the nominal four-site reuse pattern of FIG. 1. Initially, at least one subscriber unit measures the signal quality of a control channel (or a traffic channel taking into account transmit power levels as described in U.S. Pat. No. 4,481,670 issued Nov. 6, 1984, to Freeburg and assigned to instant assignee) from its current serving station (205). As understood in the art, signal quality may be determined using various metrics, several of which may be bit error rates and received signal strength indications (RSSI). The preferred embodiment utilizes RSSI to determine relative carrier to interference (C/I) caused by transmissions from a given reuse level with respect to the serving station.

Once signal quality of a channel of the serving station is measured (205), the subscriber unit measures the signal quality of channels from neighboring base sites such as any from 1a-1f through 3a-3f (210). The subscriber unit then communicates a suitable subset of these measurements to a computing site (215) such as the serving station, another base site, a switching center, or to its own on-board computing stage. The subscriber transmits the six strongest RSSIs measured.

Uplink signal quality measurements are taken of the subscriber unit (115) by the serving station (220) and neighboring base sites (225) whether or not they are from the same reuse level. This uplink signal quality information is also communicated to the computing site (215). There exists the possibility that signals from other co-channel subscriber units may be measured instead of the desired subscriber unit. To reduce this problem, directive antennas may be used, subscriber identification protocols may be used, or serving cell identification information may be obtained by other sites through system controllers.

After the uplink/downlink signal quality measurements are available to the computing unit (215), the computing unit determines relative interference for a reuse channel of the three-site reuse level (230) in relation to relative interference for a reuse channel of the one-site reuse level resulting in a reuse level gradient (250). Based upon the reuse level gradient, the system assigns the subscriber unit to at least one reuse level, such as the three-site reuse level in response to the reuse level gradient (255).

Determining the relative interference of a reuse level (230) includes using received signal strength indications (RSSI) as a signal quality metric in determining interference. The relative interference for the three-site reuse pattern is estimated by dividing a computed uplink-/downlink RSSI between the subscriber and the serving station by the sum of measured signal strengths from multiple reuse channels (control channels from base sites 3a–3f in FIG. 1) corresponding to one of the pluralities of reuse levels such as only from the three-site reuse level. This becomes the ratio of the signal strength of the subscriber unit to the at least first signal strength combination (the sum of the uplink/downlink RSSI attributed to each of the sites corresponding to the three-site reuse level "ring" 3a–3f). Therefore, although downlink measurements were taken from sites (from any of 1a–1f and 3a–3f) corresponding to numerous levels, only those measurements corresponding to the same level are used in the respective relative interference determination for any one level. This may be expressed for a three-site reuse level by the equation:

$$C/I_{relative3} = \frac{RSSI_0}{\Sigma\ RSSI_i}$$

Where $RSSI_0$ represents the determined received signal strength from and to the serving site (an average of uplink/downlink measurements for the serving station). This equation becomes an estimate of the potential worst case C/I magnitude if a three-site reuse level were to be used for the subscriber unit.

Any suitable method for measuring the various RSSI's may be used. For example, an average RSSI of the same control channel over a predetermined period of time may be used taking into account the power control to the base sites. Or an average of RSSI's taken from multiple channels from the same base site may be used. In addition, either uplink or downlink measurements may be used in the relative interference determination instead of both uplink and downlink measurements provided the reliability of one of the measurements is sufficient.

The relative interference is computed for the one-site reuse level (230) in a similar manner, resulting in relative interference for the three-site reuse level and relative interference for the one-site reuse level (the serving site reuse level). A gradient between the relative interference values is determined (250), thereby indicating a reuse level gradient (relative reuse level power gradient) between multiple reuse levels. The gradient for the three-site and one-site repeat pattern may be expressed as follows:

$$C/I_{gradient} = f\left((C/I)_3 = \frac{RSSI_0}{\sum\limits_{i=3a}^{3f} RSSI_i}, (C/I)_1 = \frac{RSSI_0}{\sum\limits_{i=1a}^{1f} RSSI_i}\right)$$

The rate at which the relative interference increases or decreases helps to determine which reuse level to assign the serving site (if it is not currently operating at that level) or the subscriber. In general, the steeper the fall-off of power with respect to the serving site, the smaller the channel reuse level that can be used. An example of this is shown in Table 1 where the threshold of acceptable C/I for the subscriber unit has been determined to be 7 dB and the C/I gradient determines whether to assign a subscriber from a four-site level to a three-site level in view of the relative interference attributed to both the three-site level and the one-site level.

TABLE 1

| $(C/I)_3$ | $(C/I)_1$ |
|---|---|
| >35dB | — |
| >30dB | >7dB |
| >25dB | >10dB |
| >20dB | >12dB |
| >15dB | >15dB |

Each row represents the minimum gradient allowable for assigning a subscriber unit from a four-site reuse level to a three-site reuse level. Therefore, when the relative interference associated with the three-site reuse level $(C/I)_3$ is greater than 30 dB and the relative interference associated with the one-site reuse level $(C/I)_1$ is greater than 7 dB, the subscriber unit will be assigned from the four-site reuse level to the three-site reuse level. The assignment is not dependent upon maintaining a predetermined fraction of subscribers in a specific reuse level. As obvious to one of ordinary skill in the art, the gradient may be dynamically selected so as to maximize capacity of the system without requiring the maintenance of a constant ratio of subscribers between multiple reuse levels. Also, when the power sum of all measured sites from the same reuse level is below a threshold, then a channel for a smaller reuse level can be used. The threshold may be a minimum C/I level acceptable to the subscriber unit based on its receiver sensitivity.

Figure 3:
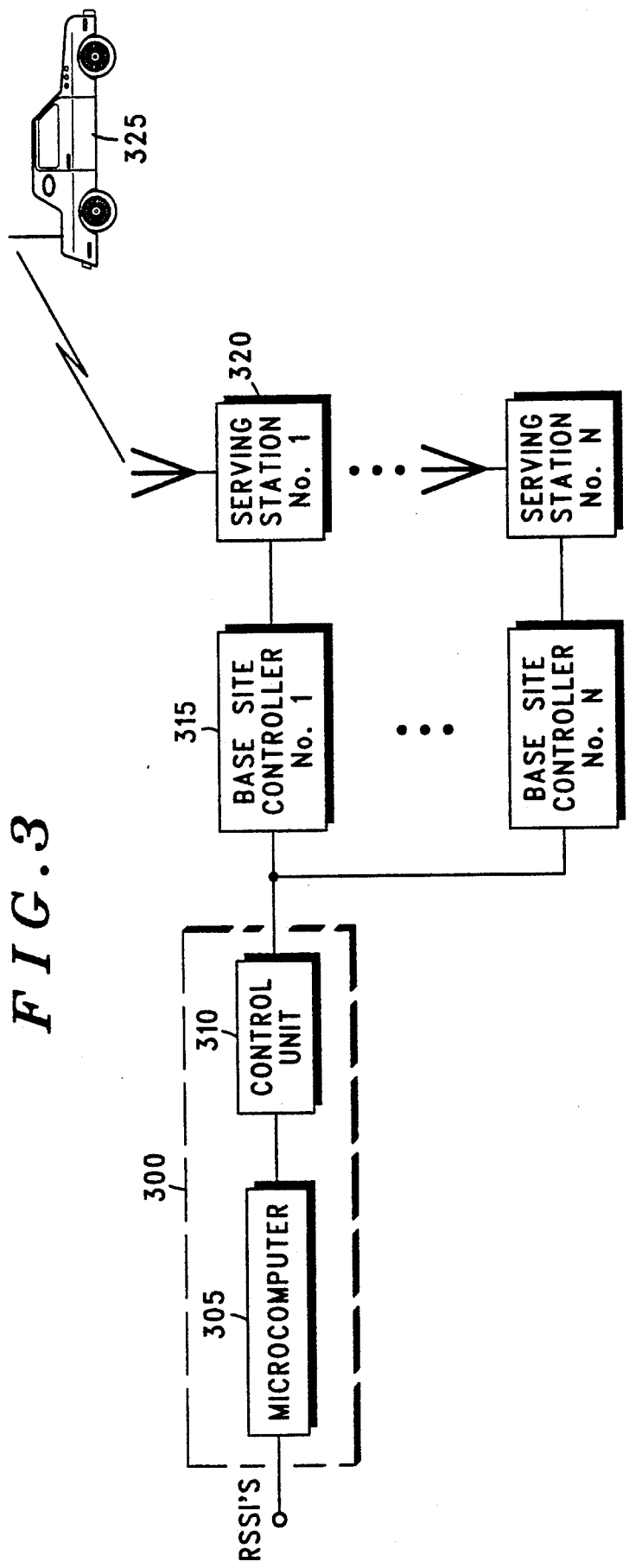
FIG. 3 is a block diagram depicting generally the computing unit for determining relative interference in accordance with the invention.

FIG. 3 depicts the block diagram of the computing unit. The computing unit (300) includes a microcomputer (305) for determining relative interference for a reuse channel of a first reuse level in relation to relative interference for a reuse channel of at least a second reuse level resulting in a reuse level gradient; and a control unit (310) for assigning the subscriber unit to at least one reuse level in response to the reuse level gradient. The computing unit may be integrated into a fixed network base site controller (315) of the type described in Motorola manual 68P81052 E50-A available from Motorola Parts Division, 1501 W. Shure Drive., Arlington Heights, Ill. 60004.

The RSSI measurements are input into the microcomputer (305) wherein the relative interference gradient is generated. The microcomputer (305) determines the appropriate resuse level for which the subscriber should be assigned and signals the control unit (310) accordingly. The control unit (310) is operably coupled to both the microcomputer (305) and a base site controller (315). The base site controller (315) then proceeds to effectuate communication between the serving site (320) and the subscriber unit (325) such that the subscriber the subscriber should be assigned and signals the control unit (310) accordingly. The control unit (310) is operably coupled to both the microcomputer (305) then proceeds to effectuate communication between the serving site (320) and the subscriber unit (325) such that the subscriber unit (325) is notified as to the appropriate reuse level. Therefore, the control unit (310), operably coupled to the base site controller (315), responds to the signal level gradient and assigns the subscriber unit (325) to a reuse level in response to the reuse level gradient.

The computing unit (300) determines a relative interference for each reuse level with respect to the serving site using channels from only those sites in a given reuse level. Again, although measurements may be taken from sites outside a given reuse level (the six best RSSI measurements from the subscriber unit may be from channels from neighboring sites using different reuse levels), the measurements are not used in the relative interference determination. A reuse level gradient between the reuse levels is generated to determine to which level to assign the serving site (when the serving site is not assigned that reuse level) or to which level to assign the subscriber unit. The relative interference measurement selectively measures interference from sites on a given reuse level, thereby supplying enough interference information to the system without necessitating a complex computational evaluation of all neighboring base sites and subscribers, while affording the system a rapid determination of the appropriate reuse levels to assign during the same conversation. The invention readily lends itself to systems that use both contiguous and non-contiguous overlapping reuse patterns. The determination method as disclosed allows for all subscribers in a coverage area to be assigned to the same reuse level.

As appreciated by those having ordinary skill in the art, the disclosed invention may be readily applied when a subscriber unit needs to be assigned a larger reuse level. For example, the gradient may be used to assign a subscriber unit from a three-site reuse level to a four-site reuse level after its C/I deteriorates to a point where continuing three-site reuse level operation will result in a dropped call.

When determining whether to assign a larger reuse level, the computing unit may also decide based solely on the relative interference of smaller levels. For instance, a base site serving a subscriber unit operating on a three-site reuse level may determine the relative interference of a one-site level and may decide to assign a larger reuse level based solely upon the relative C/I of the smaller reuse level if it is below a predetermined threshold.

Another embodiment of the invention includes having the subscriber unit measure the signal quality from only those base sites that correspond to the current reuse level, which, referring to back to FIG. 2, is the four-site reuse level comprising sites 4a–4f (210). Selectively measuring only those sites of a given reuse level also effectuates an efficient and rapid determination of interference for that reuse level. The subscriber unit then communicates these measurements to a computing site (215) such as the serving station, another base site, a switching center, or to its own on-board computing site.

Uplink signal quality measurements are taken of the subscriber unit by the serving station (220) and those base sites at the four-site reuse level (225) (sites 4a–4f in FIG. 1). This uplink signal quality information is also communicated to the computing site (215). This process of measuring the downlink/uplink signal quality is then repeated for the next smallest reuse level. In this case, the next smallest "ring" (see FIG. 1) of sites corresponds to the three-site reuse level. Therefore, the control channel signal quality from sectors 3a–3f will be measured. As is obvious to those of ordinary skill in the art, this process may be carried out to go from both a smaller reuse level to a larger reuse level or a larger reuse level to a smaller reuse level when certain interference thresholds have been met. Also, the process is readily expandable to measure the interference of more than two reuse levels.

As appreciated by those skilled in the art, the invention may be readily applied to frequency reuse systems such as in-building cellular systems wherein reuse levels may be determined by base site floor location or antenna directivity instead of typical outdoor topographic distributions generally used by conventional cellular systems. Also as appreciated by those skilled in the art, numerous alternative embodiments may be devised without departing from the spirit and scope of the claimed invention. For instance, the computation of relative interferences for a reuse level may be distributed between multiple computing units such as the subscriber unit and a separate computing site other than the serving base station.

What is claimed is:

1. In a radio frequency communication system employing channelization and having a plurality of reuse channel levels, each level having at least one associate reuse channel, a method of assigning a reuse level to a subscriber unit comprising:
    (a) determining a reuse level gradient related to relative interference for a reuse channel of a first reuse level and at least one other relative interference for a reuse channel of at least a second reuse level; and
    (b) assigning the subscriber unit to a reuse level in response to the reuse level gradient.

2. The method of claim 1 wherein assigning the subscriber unit to at least one reuse level further comprises assigning the serving station the appropriate reuse level for the subscriber unit in response to the reuse level gradient.

3. The method of claim 1 wherein determining the reuse level gradient related to relative interference occurs through the subscriber unit.

4. The method of claim 1 wherein determining the reuse level gradient related to relative interference occurs through a base site for transmitting the reuse channels.

5. The method of claim 3 wherein determining the reuse level gradient related to relative interference comprises determining relative interference using power transmission levels of a source that generates the reuse channels.

6. The method of claim 1 wherein the reuse channels associated with any reuse level are dynamically allocated to other reuse levels to accommodate varying demands in traffic while maintaining an overall structured reuse channel plan.

7. The method of claim 1 wherein determining relative interference further comprises:
    summing measured signal strengths from multiple reuse channels corresponding to one of the pluralities of reuse levels resulting in at least a first signal strength combination; and
    determining a ratio of the signal strength of the subscriber unit to the at least first signal strength combination.

8. The method of claim 1 wherein assigning the reuse level to the subscriber unit in response to the reuse level gradient comprises choosing a channel reuse level corresponding to a different frequency reuse pattern when the reuse level gradient substantially corresponds to predetermined criteria.

9. The method of claim 1 wherein a reuse level comprises a cellular frequency reuse pattern.

10. The method of claim 1 wherein a reuse level comprises time division channel reuse.

11. In a communication system employing multiple channel reuse levels, a method for assigning a channel reuse level comprising:

(a) measuring a received signal strength of at least one subscriber unit by a serving station;

(b) measuring a received signal strength of the at least one subscriber unit by proximal base sites employing reuse channels from a first channel reuse level and proximal base sites employing reuse channels from a second channel reuse level;

(c) measuring a received signal strength from the proximal base sites employing reuse channels from the first channel reuse level and the proximal base sites employing reuse channels from the second channel reuse level by the at least one subscriber unit;

(d) communicating these signal strength measurements to a computing unit;

(e) determining, using the computing unit, a first relative carrier to interference value from the received signal strengths measured by the serving station, the proximal base sites employing reuse channels from the first channel reuse level and the subscriber unit of the proximal base sites employing reuse channels from the first channel reuse level (f) determining, using the computing unit, a second relative carrier to interference value from the received signal strengths measured by the serving station, the proximal base sites employing reuse channels from the second channel reuse level and the subscriber unit of the proximal base sites employing reuse channels from the second channel reuse level;

(g) generating, using the computing unit, a reuse level gradient derived from the first relative carrier to interference value and the second relative carrier to interference value; and (h) assigning the subscriber unit to a channel reuse level based upon the reuse level gradient.

12. In a radio frequency communication system employing channelization and having a plurality of reuse channel levels, each level having at least one associated reuse channel, a computing unit comprising:

(a) means for determining a reuse level gradient related to relative interference for a reuse channel of a first reuse level and at least one other relative interference for a reuse channel of at least a second reuse level; and means, operably coupled to means for determining, for assigning the subscriber unit to a reuse level in response to the reuse level gradient.

* * * * *